(12) United States Patent
Chen

(10) Patent No.: US 6,948,220 B2
(45) Date of Patent: Sep. 27, 2005

(54) PET COLLAR BUCKLE STRUCTURE

(76) Inventor: Ying-Chih Chen, 220, Ta Pu Road, Changhua (TW)

( * ) Notice: Subject to any disclaimer, the term of this patent is extended or adjusted under 35 U.S.C. 154(b) by 29 days.

(21) Appl. No.: 10/670,736

(22) Filed: Sep. 26, 2003

(65) Prior Publication Data

US 2005/0066481 A1 Mar. 31, 2005

(30) Foreign Application Priority Data

Sep. 17, 2003 (CN) ..................................... 092216653 U

(51) Int. Cl.⁷ ............................................. A44B 11/25
(52) U.S. Cl. .......................................... 24/602; 24/662
(58) Field of Search ..................... 24/602, 662; 119/865

(56) References Cited

U.S. PATENT DOCUMENTS

| | | | | |
|---|---|---|---|---|
| 1,409,034 A | * | 3/1922 | Smith | 24/669 |
| 4,044,725 A | * | 8/1977 | Miller | 119/865 |
| 4,881,492 A | * | 11/1989 | Jones | 119/865 |
| 5,322,037 A | * | 6/1994 | Tozawa | 119/865 |
| 5,443,039 A | * | 8/1995 | Suchowski | 119/865 |
| 6,154,936 A | * | 12/2000 | Howell et al. | 24/625 |
| 6,438,811 B1 | * | 8/2002 | Watanabe | 24/697.2 |
| 6,513,207 B2 | * | 2/2003 | Uehara et al. | 24/615 |

* cited by examiner

Primary Examiner—James R. Brittain
(74) Attorney, Agent, or Firm—Rabin & Berdo, P.C.

(57) ABSTRACT

A pet collar buckle structure comprised of a plastic male member and female member. The male member consists of a stepped round face at its front end, an outer circular surface protruding from the round surface and, furthermore, a lateral notch formed in the two sides of the round face. The female member has an interior space between a surface section and two elastic clips, each elastic clip having a narrow slot formed along the outer side as well as a convex section and a concave section contiguously articulated along the inner side. As such, the male member becomes tightly ensconced following insertion into the female member, but when the male member and the female member are subjected to a certain pulling force, the male member is safely released without dead angle occurrence from the trailing end and bottom surface of the female member.

1 Claim, 9 Drawing Sheets

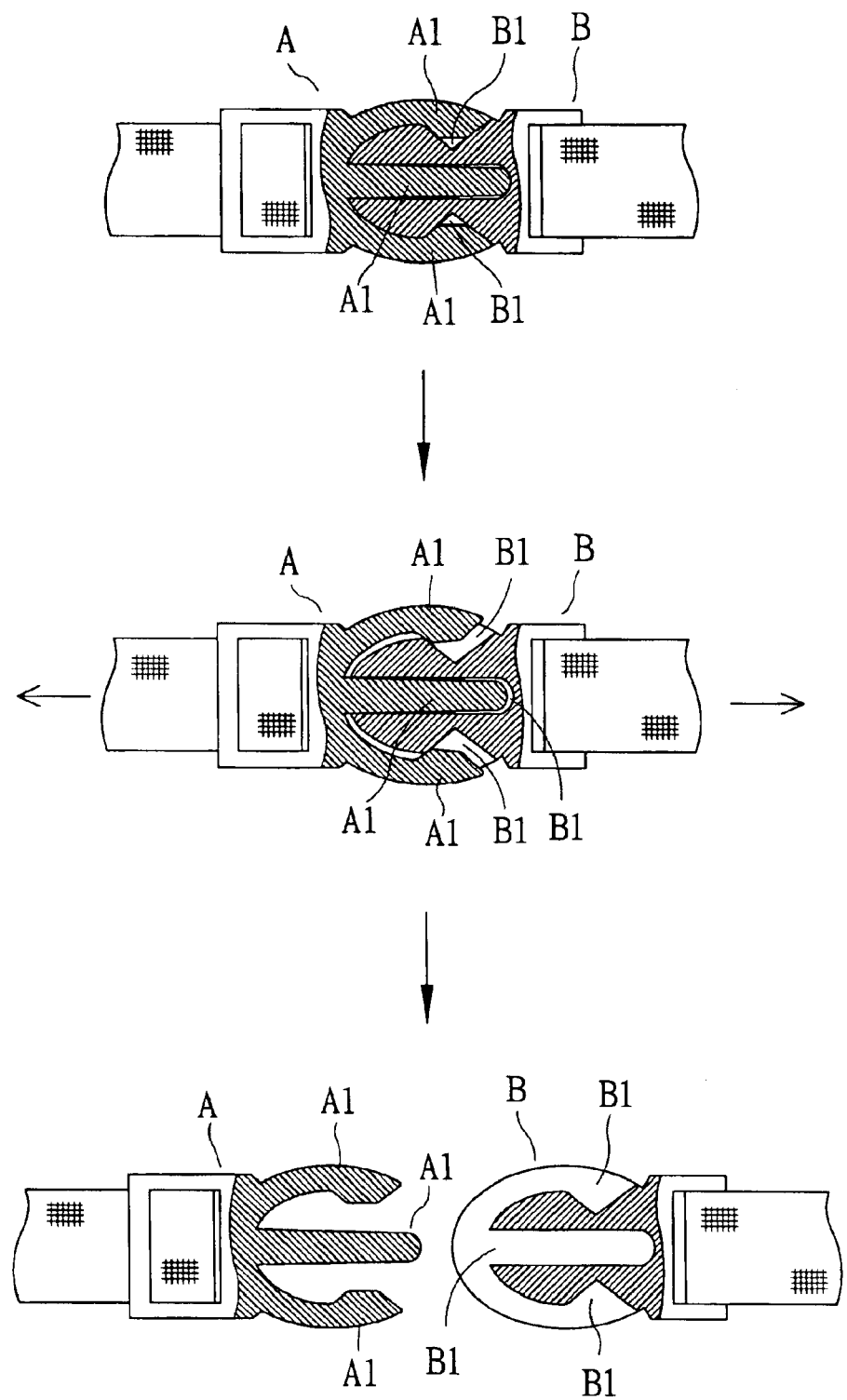
FIG.1-A
PRIOR ART

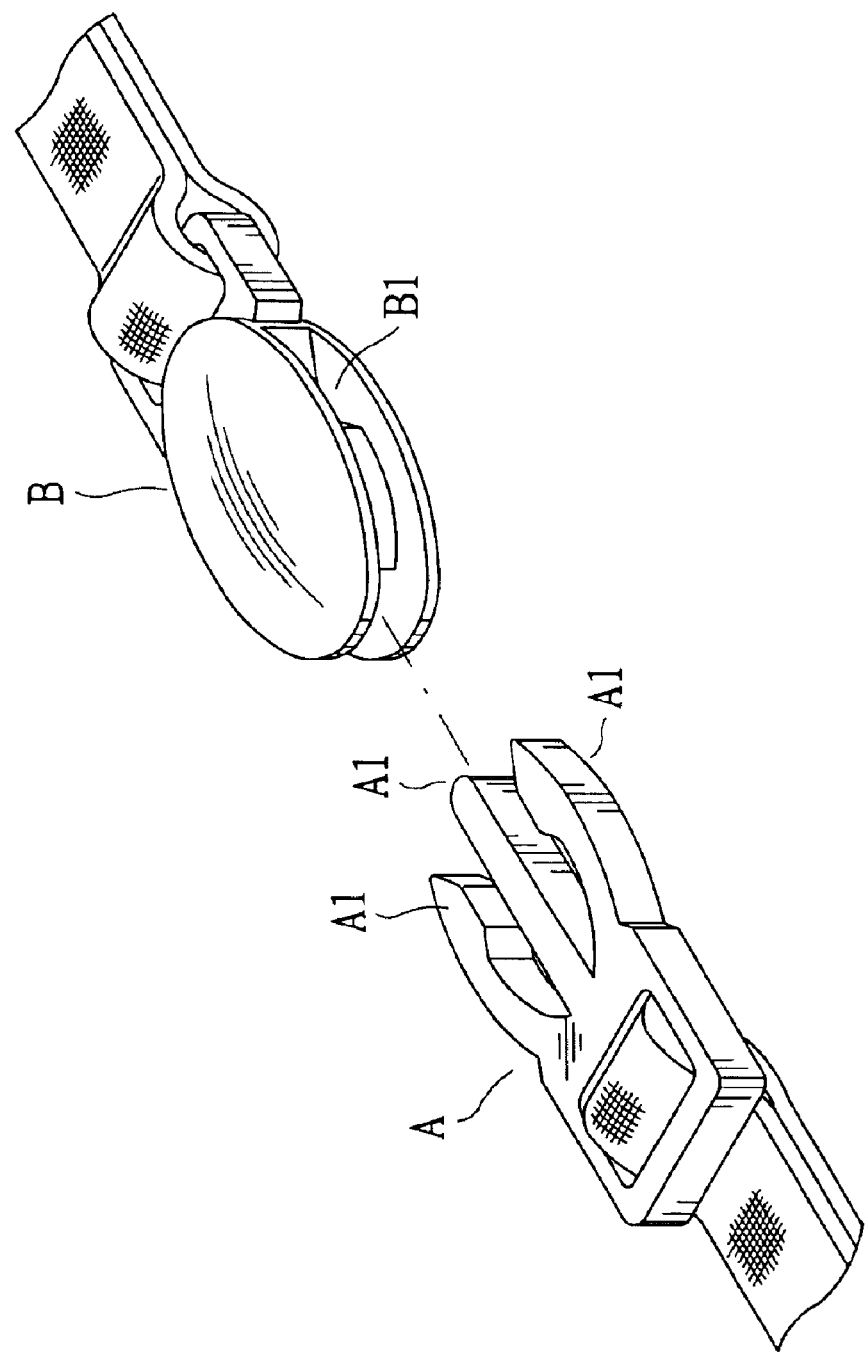
FIG. 1-B
PRIOR ART

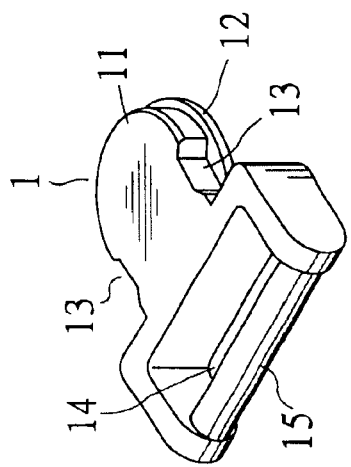
FIG.2-A
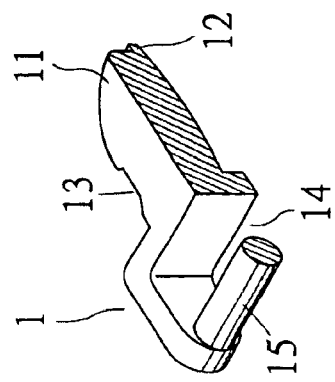
FIG.2-B
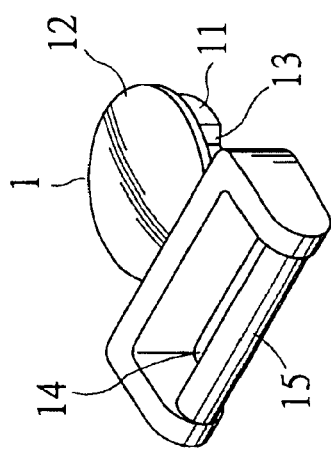
FIG.2-C

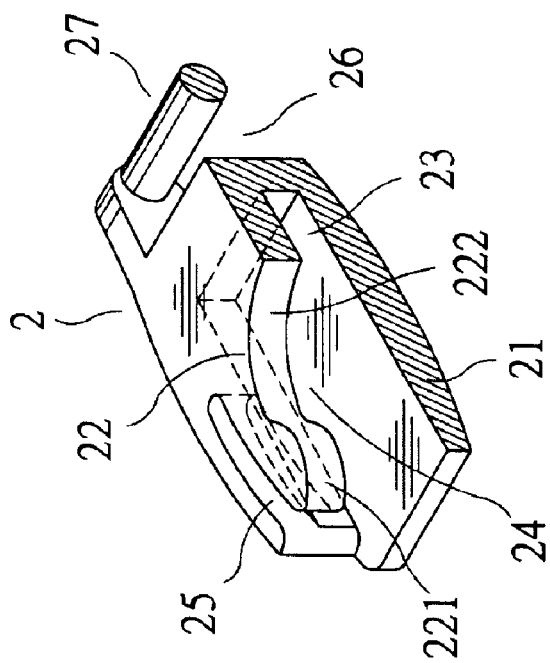
FIG.3-B
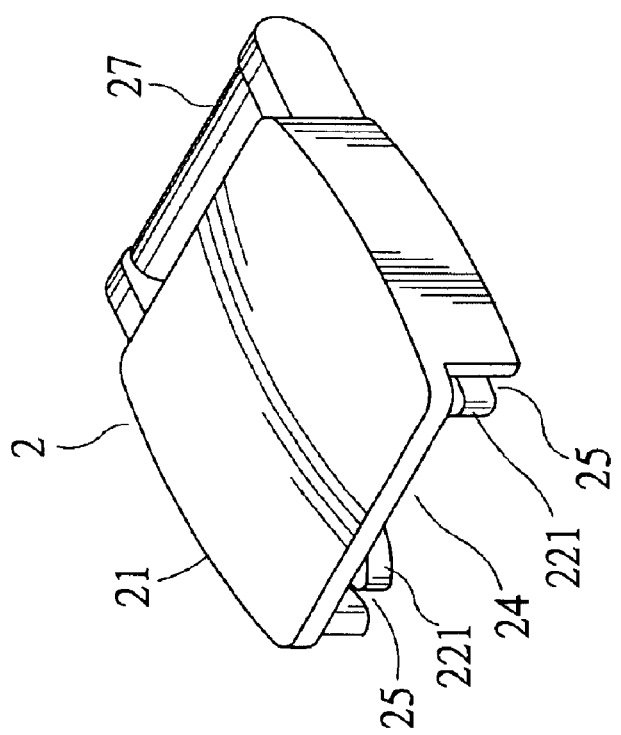
FIG.3-A

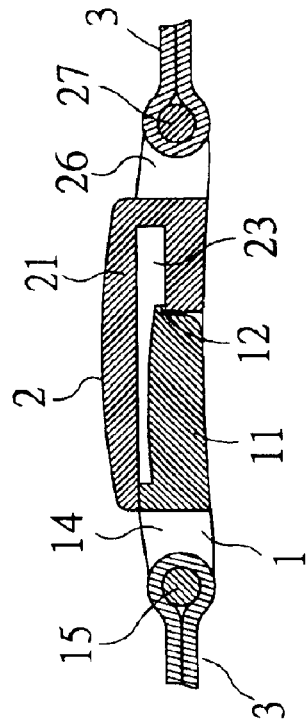
FIG.5-C
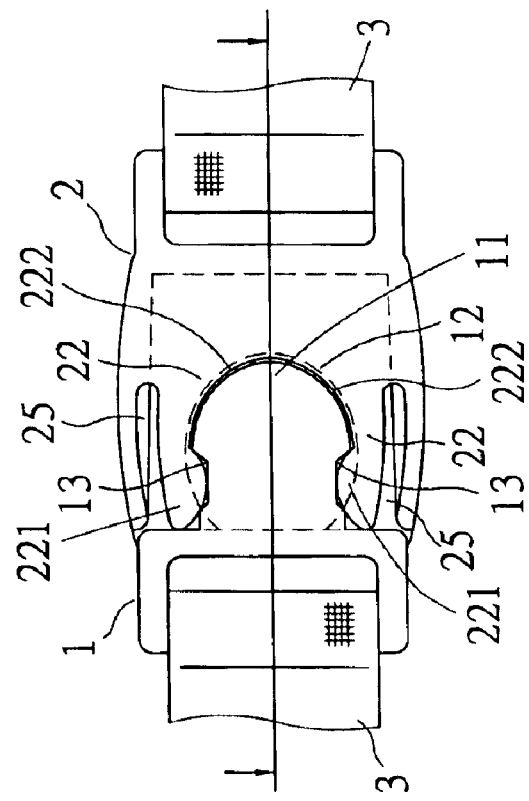
FIG.5-B
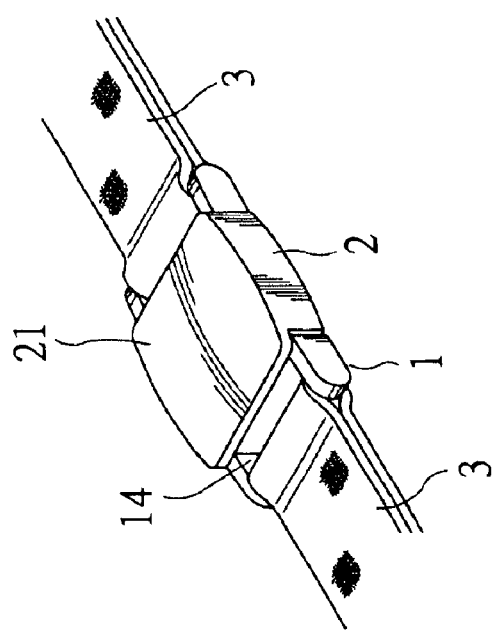
FIG.5-A

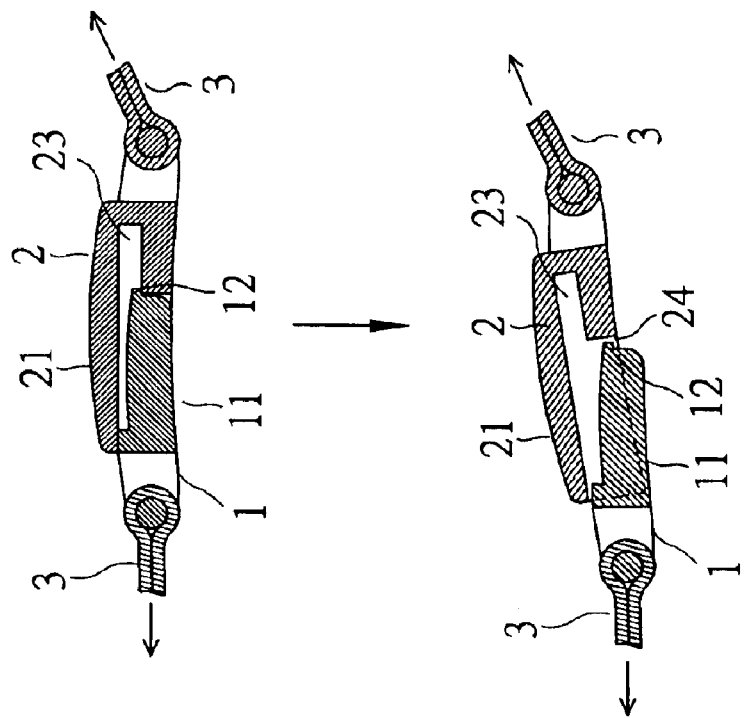
FIG.7-A
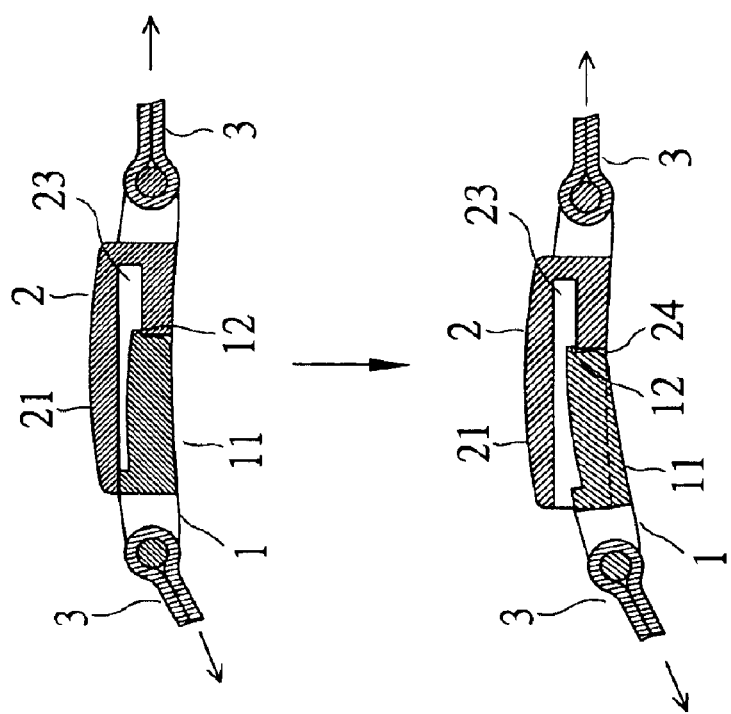
FIG.7-B

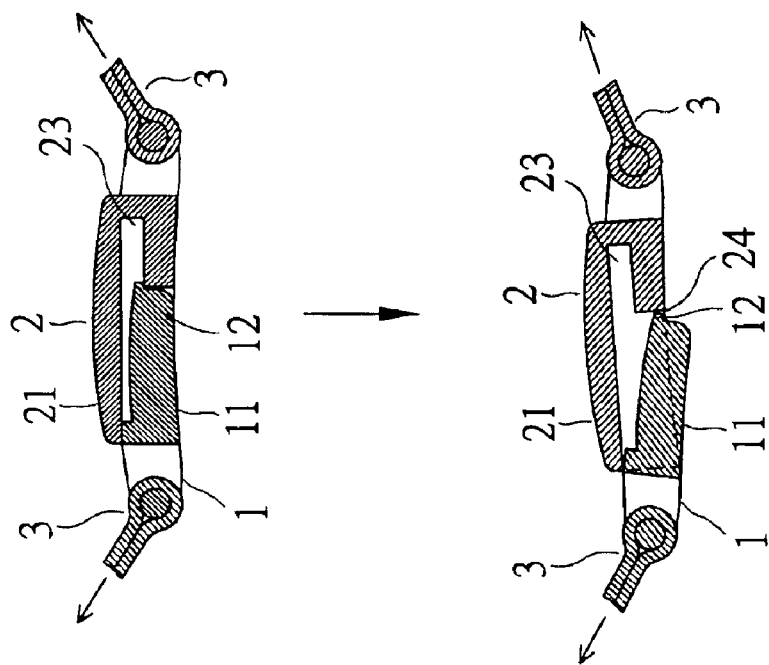
FIG. 7-C
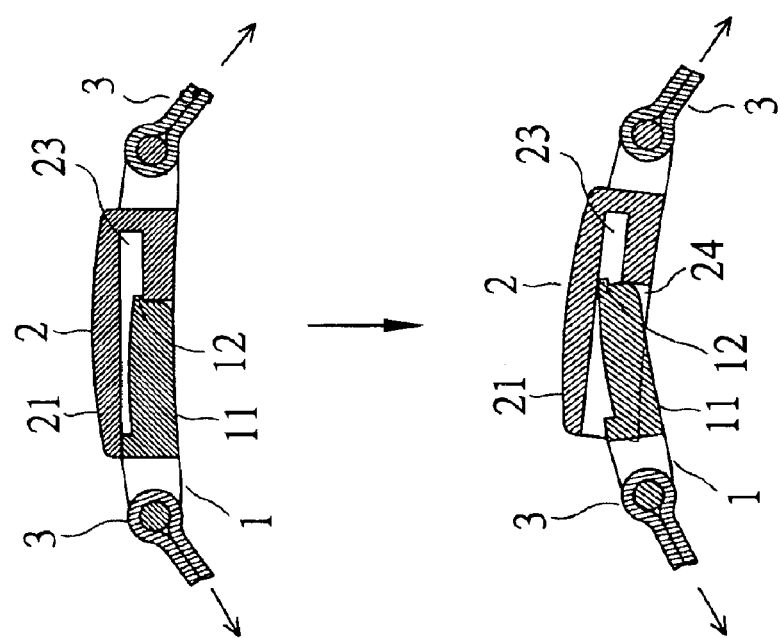
FIG. 7-D

PET COLLAR BUCKLE STRUCTURE

BACKGROUND OF THE INVENTION

1) Field of the Invention

The invention herein relates to pet supplies, specifically a pet collar buckle structure comprised of a plastic male member and female member such that when the male member and the female member are subjected to a certain pulling force, the said male member is safely released without dead angle occurrence from the trailing end and bottom surface of the female member.

2) Description of the Prior Art

There are currently many pet products, including specially developed items such as collars for domestic cats and dogs that provide for animal identification and owner leash attachment that prevents leaving a given area. However, the said pets cannot be kept under complete owner control, with movements such as rolling, circling, and jumping about tugging the leash to the extent that neck of the pet becomes choked, at which time rapid loosening and unfastening is required to alleviate breathing difficulty and possibly death. As a result, a type has been developed in which the male and female buckle members separate at a set amount of pull to thereby avert pet casualties due to the human design faults. Referring to FIG. 1-A and FIG. 1-B of the known structure, the male member A and female member B are fastened through insertion. The three prong sections Al at the left, center, and right of the male member A are fitted into the three receptacle sections Bi of the female member B to become a three-way retained conjoinment such that when separation is desired, the male member A and the female member B only require a set amount of pull to achieve separation at a straight angular orientation, as indicated in FIG. 1-B. As such, although separation is provided for emergency situations, following repeated usages, based on the original structural design, the male member A is inserted into the female member B at a straight angle and must be removed at straight angle, but when the pet rolls and circles round as happens in actual situations, release at a straight angle as per the original design is not possible. The separation angle of the male member A and the female member B on the collar is not always along the same axis in a straight orientation. If the male member A and the female member B are each pulled apart at different angles, and when the angular difference is not very large, they are torn apart by brute force to effect separation. When the angular difference is excessively large, the male member A and the female member B cannot be separated at a straight angle, and the collar becomes a potential source of injury to the animal and a hazard waiting to occur. Additionally, after the male member A and the female member B are forcibly torn apart to effect separation, the three prong sections A1 at the left, center, and right of the male member A that serve as the three points of conjoinment between the male member A and the female member B are broken or worn beyond usability such that the damaged male member A and the female member B are inoperable as buckle components.

SUMMARY OF THE INVENTION

In view of the structural shortcomings of the pet collar, the applicant of the invention herein submitted the content of the invention herein, wherein:

The objective of the invention herein is to provide a pet collar buckle structure comprised of a plastic male member and female member; the said male member includes a stepped round face at its front end, enabling an outer circular surface to protrude from the round surface, and a lateral notch formed in the two sides of the round face; the female member has an interior space between a surface section and two elastic clips, each elastic clip having a narrow slot formed along the outer side as well as a convex section and a concave section contiguously articulated along the inner side; when the male member is placed into the female member, the two elastic clips of the female member then arrest the round face of the male member and retained it in position and, furthermore, the outer circular surface of the male member becomes located in the interior space between the surface section and the two elastic clips of the female member; when the male member and the female member is subjected to a certain pulling force, the said male member is released from the trailing end and bottom surface of the female member in two directions; as such, no dead angle occurs and unfastening is safe.

BRIEF DESCRIPTION OF THE DRAWINGS

FIG. 1-A is an isometric drawing of a conventional structure.

FIG. 1-B is an orthographic drawing of the conventional structure in the released state.

FIG. 2-A is an isometric drawing of the male buckle member of the invention herein.

FIG. 2-B is an isometric drawing of the male buckle member of the invention herein, as viewed from the opposite side.

FIG. 2-C is a cross-sectional drawing of the male buckle member of the invention herein, as viewed from the opposite side.

FIG. 3-A is an isometric drawing of the female buckle member of the invention herein, as viewed from the opposite side.

FIG. 3-B is an isometric drawing of the female buckle member of the invention herein.

FIG. 5-A is an isometric drawing of the invention herein after engagement.

FIG. 5-B is an orthographic drawing of the invention herein after engagement.

FIG. 5-C is a cross-sectional drawing of the invention herein after engagement.

FIG. 7-A is a cross-sectional drawing of the male buckle member of the invention herein released from the female buckle member bottom surface (1).

FIG. 7-B is a cross-sectional drawing of the male buckle member of the invention herein released from the female buckle member bottom surface (2).

FIG. 7-C is a cross-sectional drawing of the male buckle member of the invention herein released from the female buckle member bottom surface (3).

FIG. 7-D is a cross-sectional drawing of the male buckle member of the invention herein released from the female buckle member bottom surface (3).

DETAILED DESCRIPTION OF THE INVENTION

Figure 4:
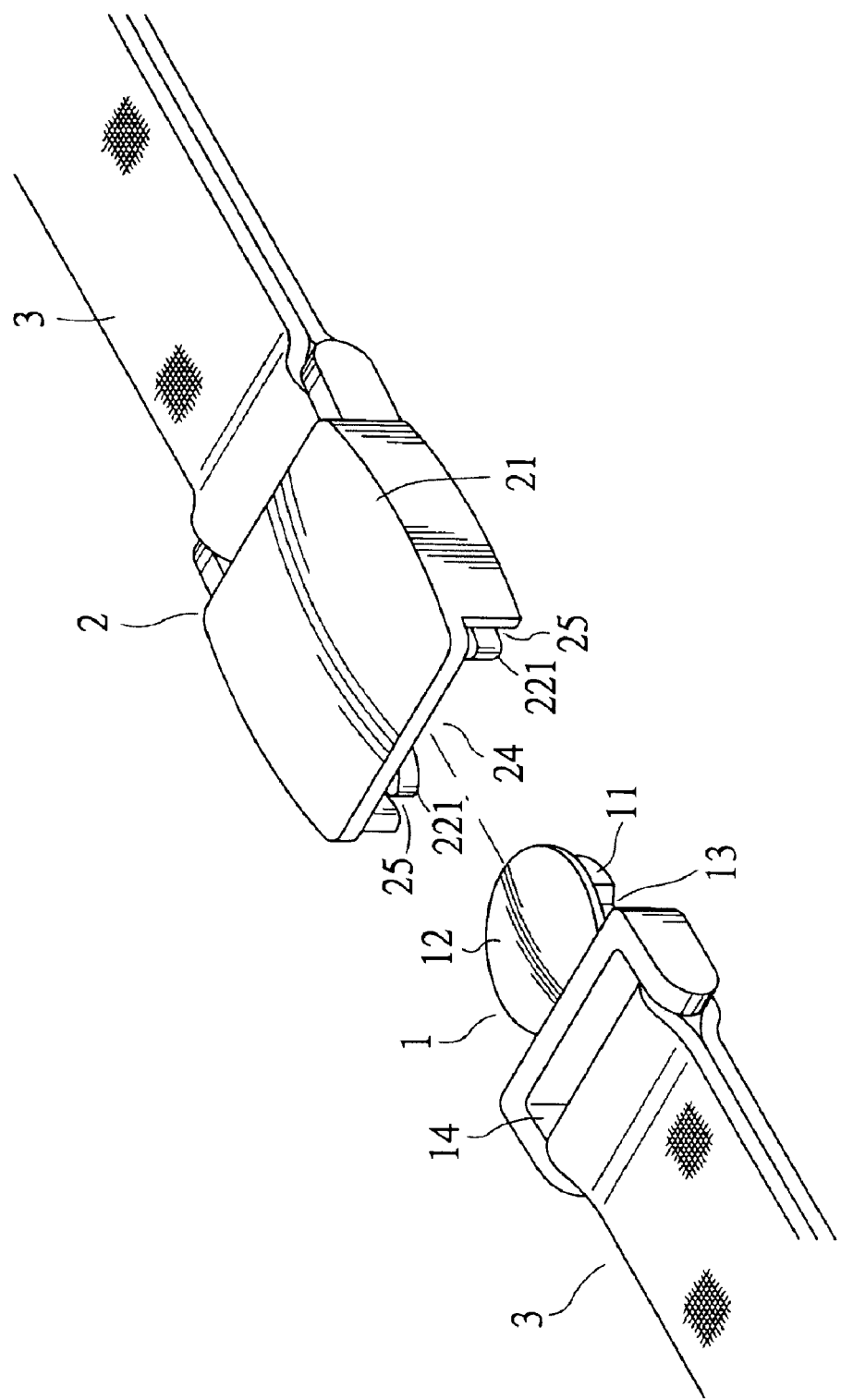
FIG. 4 is an isometric drawing of the invention herein preparatory to engagement.

Referring to FIG. 2-A, FIG. 2-B, FIG. 2-C, FIG, 3-A, and FIG. 3B, the pet collar buckle structure is comprised of a plastic male member 1 and female member 2. The male member 1 consists of a stepped round face 11 at its front end, enabling an outer circular surface 12 to protrude from the round surface 11. A lateral notch 13 formed in the two sides of the round face 11, and a clevis 14 disposed at its rear end with a horizontal bar 15 across the clevis 14 that provides for the insertional coupling of one extremity of a collar 3. The female member 2 has a surface section 21 that is of a planar arrangement and, furthermore two elastic clips 22 are situated at the lower side of the surface section 21, wherein an interior space 23 remains between the surface section 21 and the two elastic clips 22. A convex section 221 and a concave section 222 are contiguously articulated along the inner side of the said two elastic clips 22 such that a reticulated section 24 matching the shape of the male member 1 round face 11 is formed within the inner sides of the two elastic clips 22. The reticulated section 24 and the interior space 23 are confluent and, furthermore, a narrow slot 25 is formed along the outer side of each elastic clip 22. The female member 2 has a clevis 26 at its rear end with a horizontal bar 27 across the clevis 26 that provides for the insertional coupling of the opposite extremity of the collar 3 (as shown in FIG. 3-A and FIG. 3-B).

Figure 6:
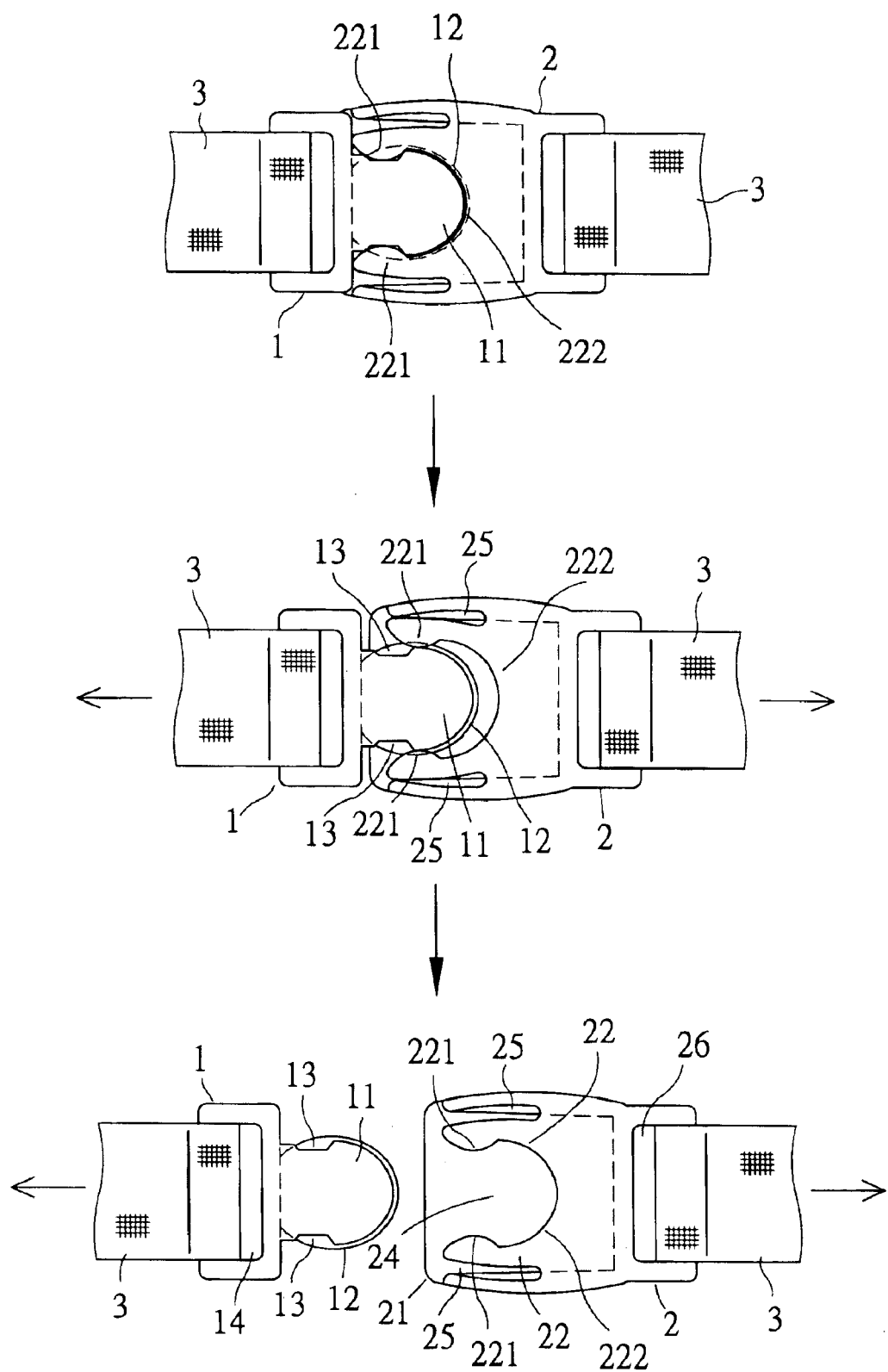
FIG. 6 is an orthographic drawing of the invention herein in the released state.

As such, when the male member 1 is placed into the female member 2, as indicated in FIG. 4, the round face 11 of the male member 1 becomes situated within the reticulated area 24 inside the two elastic clips 22 of the female member 2 and retained in position by the engagement of the convex sections 221 at the anterior extent of the two elastic clips 22 into the lateral notches 13 formed in the two sides of the round face 11 (as shown in FIG. 5-A and 5-B) and, furthermore, the outer circular surface 12 of the male member 1 becomes located in the interior space 23 between the surface section 21 and the two elastic clips 22 of the female member 2 (as shown in FIG. 5-B and FIG. 5-C), thereby completing the placement of the collar 3 on the pet. When the collar 2 must be unfastened, with the male member 1 and the female 2 member under a certain pulling force, the male member 1 is released at a straight angle by propping open the two elastic clips 22 at the trailing end of the female member 2, as indicated in FIG. 6.

When the collar 3 placed on a pet, since the unfastened male member A and the female member B are not necessarily along the same horizontal axis, the male member A and female member B are pulled apart at a different angle, at which time since the other surface of the female member 2 surface section 21—at the reticulated section 24 along the inner sides of the elastic clips 22—and the reticulated section 24 are confluent with the interior space 23, regardless of whether both the male member A and the female member B are at two differing angles when pulled, as indicated in FIG. 7-A, FIG. 7-B, FIG. 7-C, and FIG. 7-D, the round face 11 of the male member 1 can be drawn in the pulled direction from its original position inside the two elastic clips 22 and the reticulated section 24 of the female member 2, causing the round surface 11 of the male member 1 to move outside the reticulated section 24 while additionally assisted by the plastic elasticity of the two, the male member 1 thereby smoothly released from the female member 2 at a different angles, which is more practical than the conventional male member A surrounded on two sides by the female member B and thus capable of operating at only a single horizontal angle.

As such, since the structural design of the invention herein includes comprehensive safety considerations to support actual situations and unfastening at the right time to completely solve the design shortcomings of the conventional unfastening arrangement and, furthermore, is demonstrably progressive in capability, the present invention meets the application requirements and is submitted to the patent bureau for review and the granting of the commensurate patent rights.

What is claimed is:

1. A pet collar buckle structure, comprising:

a plastic male member having a stepped round face at a front end thereof, and an outer circular surface protruding from the round surface, a lateral notch being formed in the two sides of the round face, and a clevis disposed at a rear end thereof with a horizontal bar across the clevis that provides for the insertional coupling of one extremity of a collar; and a female member having a surface section that is of a planar arrangement and, having two elastic clips situated at a lower side of the surface section, wherein an interior space remains between the surface section and the two elastic clips;

wherein a convex section and a concave section are contiguously articulated along an inner side of the two elastic clips such that a reticulated section matching a shape of the male member round face is formed within the inner sides of the two elastic clips;

wherein the reticulated section and the interior space are confluent and a narrow slot is formed along an outer side of each elastic clip;

wherein the female member has a clevis at a rear end thereof with a horizontal bar across the clevis of the female member that provides for an insertional coupling of an opposite extremity of the collar;

wherein when the male member is placed into the female member, the two elastic clips of the female member arrest the round face of the male member and retain the round face in position and the outer circular surface of the male member becomes located in the interior space between the surface section and the two elastic clips of the female member; and wherein when the male member and the female member are subjected to a certain pulling force, the male member is released from the female member.

* * * * *